United States Patent
Watabe et al.

(10) Patent No.: US 7,742,840 B2
(45) Date of Patent: Jun. 22, 2010

(54) AUTONOMOUS MOBILE ROBOT

(75) Inventors: Tomoki Watabe, Saitama (JP); Tsukasa Sugino, Saitama (JP); Koji Kawabe, Saitama (JP); Minami Asatani, Saitama (JP); Taku Osada, Saitama (JP); Takahide Yoshiike, Saitama (JP); Takashi Nakayama, Saitama (JP); Shintarou Fujita, Saitama (JP)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 1221 days.

(21) Appl. No.: 11/294,456

(22) Filed: Dec. 6, 2005

(65) Prior Publication Data

US 2006/0129276 A1    Jun. 15, 2006

(30) Foreign Application Priority Data

Dec. 14, 2004    (JP) .............................. 2004-361905

(51) Int. Cl.
 *G06F 19/00* (2006.01)
(52) U.S. Cl. ..................... 700/253; 700/245; 700/259; 901/1; 701/207; 701/208; 701/223
(58) Field of Classification Search ................. 700/253, 700/245, 259; 901/1; 342/53, 64; 318/568.12; 701/23, 25, 26, 207, 208, 210, 223
See application file for complete search history.

(56) References Cited

U.S. PATENT DOCUMENTS 4,777,416 A * 10/1988 George et al. .......... 318/568.12
4,829,442 A * 5/1989 Kadonoff et al. ............. 701/207
5,446,356 A * 8/1995 Kim ........................... 318/587

(Continued)

FOREIGN PATENT DOCUMENTS

JP    06-043935    2/1994

(Continued)

OTHER PUBLICATIONS

Staedter, Tracy. Robot With "Whegs". Oct. 31, 2005. Discovery News.*

(Continued)

*Primary Examiner*—Khoi Tran
*Assistant Examiner*—Spencer Patton
(74) *Attorney, Agent, or Firm*—Squire, Sanders & Dempsey L.L.P.

(57) ABSTRACT

Disclosed is a space-saving autonomous mobile robot capable of switching two types of light irradiation appropriately. The robot includes a moving mechanism, an autonomous movement controller for controlling the moving mechanism, a self-location recognition unit for sensing a self-location of the robot, a map data storage unit for storing a map data on locations of marks, a slit light device for irradiating a detection area with slit light, an infrared device for irradiating a detection area with infrared rays, and a switch determination unit for comparing a mark-formed region and the self-location, and then, for switching between the slit light and infrared devices, based on the comparison result. Moreover, the infrared device irradiates the detection area when the self-location is within the mark-formed region, while the slit light device irradiates the detection area when the self-location is outside the mark-formed region.

10 Claims, 5 Drawing Sheets

U.S. PATENT DOCUMENTS

| | | | |
|---|---|---|---|
| 6,642,955 B1 * | 11/2003 | Midgley et al. | 348/164 |
| 2002/0052711 A1 * | 5/2002 | Aoyama | 702/158 |
| 2004/0167688 A1 * | 8/2004 | Karlsson et al. | 701/23 |
| 2005/0222713 A1 * | 10/2005 | Kawabe et al. | 700/259 |
| 2006/0076039 A1 * | 4/2006 | Song et al. | 134/21 |

FOREIGN PATENT DOCUMENTS

| | | |
|---|---|---|
| JP | 2002-144278 | 5/2002 |
| JP | 2002-149240 | 5/2002 |

OTHER PUBLICATIONS

Kumagai Masaaki. Development of a 3D Vision Range Sensor using Equiphase Light-Section Method. Sep. 26, 2004-Oct. 2, 2004. 2004 IEEE/RSJ International Conference on Intelligent Robots and Systems. pp. 2161-2166.*

* cited by examiner

AUTONOMOUS MOBILE ROBOT

CROSS-REFERENCE TO RELATED APPLICATIONS

This application claims the benefit of Japanese Patent Application 2004-361905 filed on Dec., 14, 2004, the disclosure of which is incorporated herein by reference.

BACKGROUND OF THE INVENTION

1. Field of the Invention

The present invention relates to autonomous mobile robots, generally. More specifically, the present invention is directed to an autonomous mobile robot equipped with both a road surface sensing device and a current location verification device.

2. Description of the Related Art

A typical mobile robot is equipped with a device for checking a road surface, which is called "road surface sensing device" This device has a function of determining whether or not there is any obstacle in front of the robot. Specifically, the device irradiates a road surface in front of the robot with predetermined slit light, and then, captures an image of the irradiated area. Finally, it analyzes the pattern of the light in the captured image (see Japanese Unexamined Patent Application Publications 6-43935 and 2002-144278).

In addition, a typical mobile robot is equipped with a device for verifying its current location, which is called "current location verification device". This device allows the robot to pick up images of landmarks formed beforehand on an active area, and it then verifies or recognizes the current location or the surrounding conditions of the robot, based on features of the captured landmarks, such as a color, size or shape (Japanese Unexamined Patent Application Publication 2002-149240).

Generally, a robot, particularly a legged robot is provided with various systems such as sensors, circuits and power units. Therefore, it is difficult for such a robot to have an inner space enough to accommodate both a road surface sensing device and a current location verification device. If both devices are accommodated, then the robot ends up enlarged.

Moreover, if installed in a robot, then both devices need to be switched appropriately in order to save the energy. This is because landmarks are not necessarily formed throughout the active area.

The present invention has been conceived, taking the above description into account. An object of the present invention is to provide a space-saving autonomous mobile robot capable of switching two types of light irradiation, such as infrared rays and slit light, appropriately.

SUMMARY OF THE INVENTION

According to an aspect of the present invention, there is provided, an autonomous mobile robot including:

(a1) a moving mechanism;

(a2) an autonomous movement controller for controlling the moving mechanism;

(a3) a self-location recognition unit for sensing a self-location of the autonomous mobile robot within an active area;

(a4) a map data storage unit for storing a map data on locations of marks formed on the active area;

(a5) a slit light device for irradiating a detection area with slit light;

(a6) an infrared device for irradiating a detection area with infrared rays;

(a7) a switch determination unit for comparing a mark-formed region stored in the map data storage unit and the self-location sensed by the self-location recognition unit, and then, for switching between the slit light device and the infrared device, based on a result of the comparison;

(a8) a capture unit for capturing an image of the detection area irradiated by the slit light or infrared rays;

(a9) a road surface sensing unit for detecting conditions of a road surface by analyzing the captured image of the detection area being irradiated with the slit light; and (a10) a mark sensing unit for detecting marks by analyzing the captured image of the detection area being irradiated with the infrared rays. In addition, the infrared device irradiates the detection area when the self-location is within the mark-formed region, while the slit light device irradiates the detection area when the self-location is out of the mark-formed region.

Moreover, it is preferable that the autonomous mobile robot includes a self-location correction unit for correcting the self-location, based on locations of the marks detected by the mark sensing unit.

According to another aspect of the present invention, there is provided, a process for controlling an autonomous mobile robot including the steps of:

(b1) sensing a self-location of the autonomous mobile robot within an active area;

(b2) acquiring a map data on locations of marks formed on the active area;

(b3) comparing the self-location and a mark-formed region being acquired from the map data; and (b4) switching between slit light and infrared rays, based on a result of the comparison, so that a detection area is irradiated. In addition, the slit light and the infrared rays are switched in such a way that the detection area is irradiated by the infrared rays when the self-location is within the mark-formed region, while the detection area is irradiated by the slit light when the self-location is out of the mark-formed region.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A detailed description will be given below, of an autonomous mobile robot according to an embodiment of the present invention, with reference to accompanying drawings. In the following description, the same reference numerals are given to the same parts, and duplicate description is therefore omitted.

<Configuration of Autonomous Mobile Robot>

First, an autonomous mobile robot of one embodiment of the present invention will be given below, with reference to FIG. 1. Thereinafter, an autonomous mobile robot is just called "robot", occasionally.

Figure 1A:
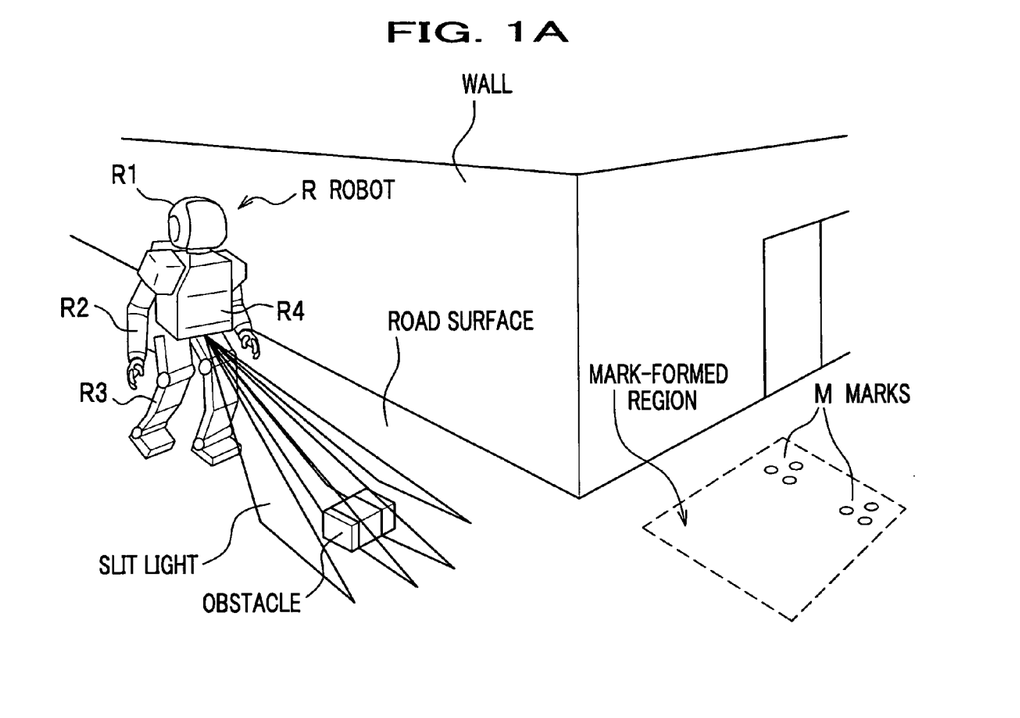
FIG. 1A is a view depicting an autonomous mobile robot according to one embodiment of the present invention, which irradiates a detection area with slit light.
Figure 1B:
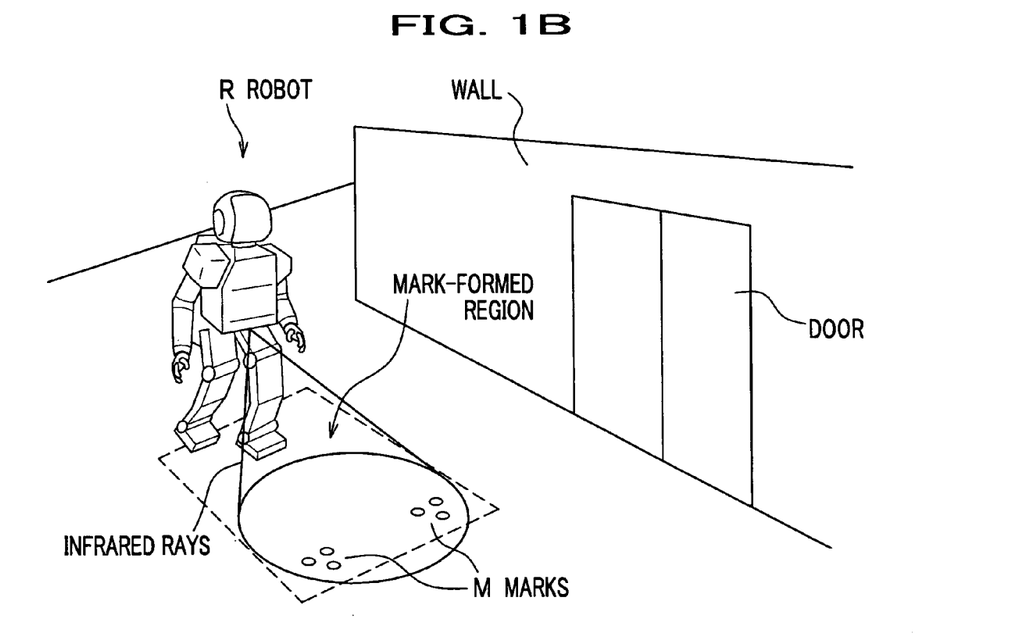
FIG. 1B is a view depicting the autonomous mobile robot which irradiates a mark-formed region with infrared rays.

Referring to FIGS. 1A and 1B, a robot R includes a head R1, arms R2, legs R3 and a body R4. The head R1, arms R2 and legs R3 are driven by individual actuators, and the bipedal movement is controlled by an autonomous movement controller 50 (see FIG. 2). Herein, the legs R3 which are called "legged moving mechanism". The detail of the bipedal movement is disclosed by Japanese Unexamined Patent Application Publication 2001-62760, etc.

The robot R moves around within an active area such as an office or a hallway in order to execute specific tasks, for example, the delivery of documents. While moving, the robot R checks the road surface of the area or searches for marks M thereon by irradiating the surface with laser slit light or infrared rays, as shown in FIGS. 1A and 1B. Specifically, the robot R checks its current location, and when being within an active area, the robot R detects step heights, bumps, dips or obstacles by irradiating the area surface with the laser slit light. Meanwhile, when being within a specific area where marks M are formed, the robot R detects the marks M by irradiating the area surface with the infrared rays, thereby verifying or correcting the current location.

The marks M, which are made of an infrared-reflecting material, are formed on the specific areas within the active area, for example, an area in front of a door. It is preferable that each mark M be transparent or small enough not to worsen the sight of the area. In this embodiment, three reflecting points make up a single mark M, and two marks M make a pair, as shown in FIG. 1B. The marks M is related to location data, and this data is contained in map data and stored in a map data storage unit.

Figure 2:
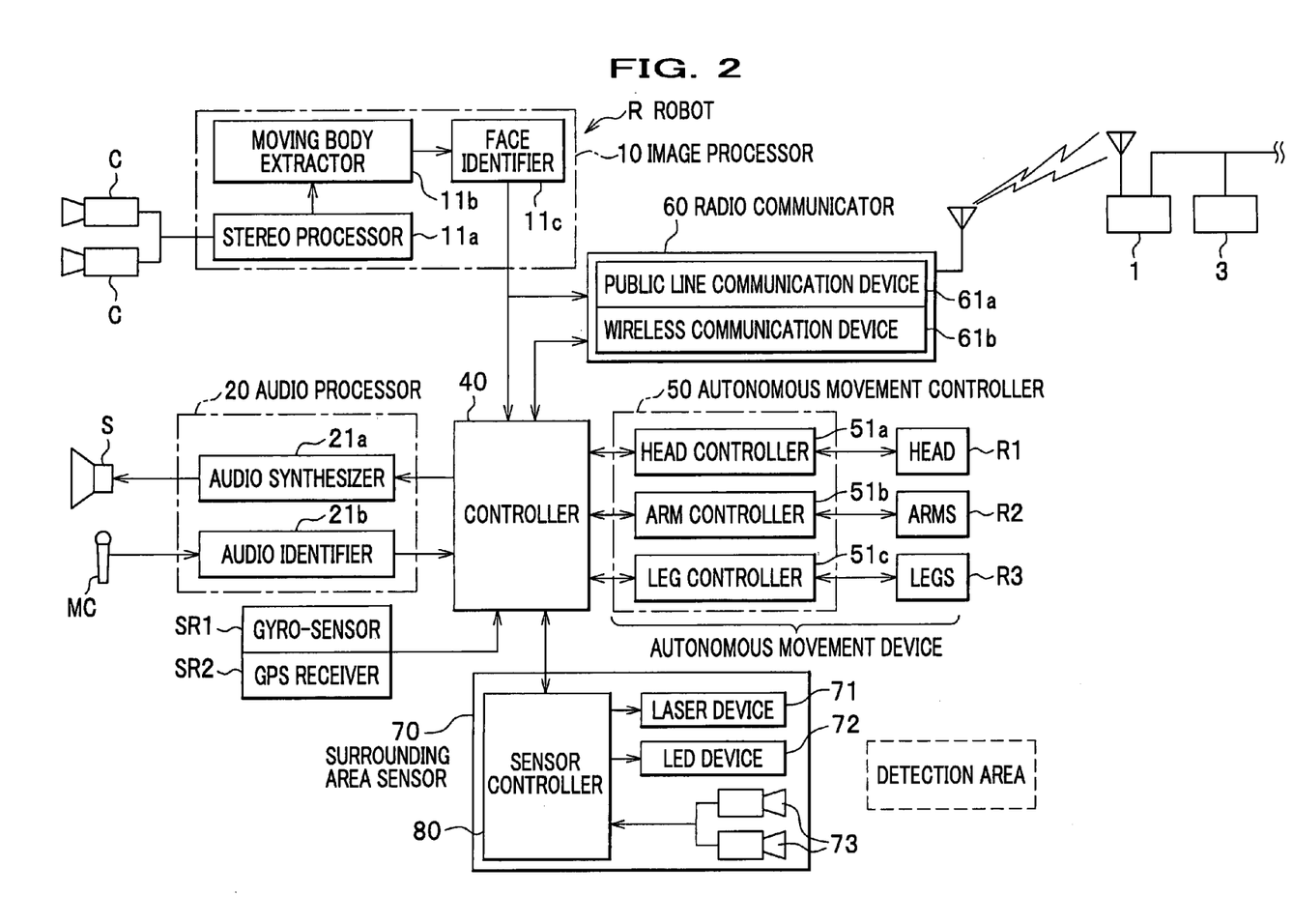
FIG. 2 is a block diagram of a configuration of the autonomous mobile robot.

Next, referring to FIG. 2, the robot R includes the head R1, the arms R2, the legs R3, the body R4 (not shown), the cameras C and C, a speaker S, a microphone MC, an image processor 10, an audio processor 20, a controller 40, an autonomous movement controller 50, a radio communicator 60, and a surrounding area sensor 70. Furthermore, the robot R includes a gyro-sensor SR1 for sensing its orientation, and a GPS (global positioning system) receiver SR2 for recognizing its coordinates. Herein, the gyro-sensor SR1 and the GPS receiver are included in a self-location recognition unit.

[Camera]

The cameras C and C have a function of producing digital images of objects, and they may be color CCD (Charge-Coupled Device) cameras. The cameras C and C are arranged horizontally, and output the produced images to the image processor 10. The cameras C and C, the speaker S and the microphone MC are contained in the head R1.

[Image Processor]

The image processor 10 has a function of treating the images received from the cameras C and C, and it recognizes the presence or absence of persons and obstacles around the robot R in order to realize the surrounding conditions. This image processor 10 is composed of a stereo processor 11a, a moving body extractor 11b, and a face identifier 11c.

The stereo processor 11a performs pattern matching by using, as a reference, one of the respective two images captured by the cameras C and C. Following this, the processor 11a determines the parallaxes between the pixels of one image and the corresponding pixels of the other image, thus generating a parallax image. Finally, it outputs the parallax image and the original images to the moving body extractor 11b. Note that the parallax depends on a distance between the robot R and a captured object.

The moving body extractor 11b takes out one or more moving bodies from the captured image, based on the images from the stereo processor 11a. This action is done to recognize one or more persons, under the condition that a moving object (or body) is a person. To take out a moving body, the moving body extractor 11b memorizes several past frames, and it carries out the pattern matching by comparing the latest frame (or image) and the past frames (or images). As a result, the moving body extractor 11b determines the moving amounts of the pixels, and produces moving amount images. If the moving body extractor 11b checks whether or not there is any pixel with a large moving amount, based on the parallax image and the moving amount image. If the pixel with a large moving amount is found, then the moving body extractor 11b determines that a person is present within an area at a predetermined distance away from the cameras C and C. Following this, the moving body extractor 11b outputs the image of the person to the face identifier 11c.

The face identifier 11c takes out skin-colored portions from the image of the moving body, and recognizes the position of its face, based on the size, shape, etc. of the extracted portions. Similarly, the face identifier 11c recognizes the position of the hands. The face identifier 11c outputs data on the recognized face position to the controller 40 so that the data is used to move or communicate with the owner of the face. Also, it outputs data on the recognized face position to the radio communicator 60, as well as to the robot controller 3 through a base station

[Audio Processor]

The audio processor 20 is composed of an audio synthesizer 21a and an audio identifier 21b. The audio synthesizer 21a generates audio data from character information stored beforehand, based on a speech action instruction determined and outputted by the controller 40. Subsequently, the audio synthesizer 21a outputs the generated audio data to the speaker S. Upon generation of the audio data, the relation between the character information and the audio data is used.

The audio identifier 21b generates the character information from the audio database on the relation between the audio data (having been inputted from the microphone MC) and the character information. Subsequently, the audio identifier 21b outputs the generated character information to the controller 40.

[Autonomous Movement Controller]

The autonomous movement controller 50 is composed of a head controller 51a, an arm controller 51b, and a leg controller 51c. The head controller 51a, the arm controller 51b and the leg controller 51c drive the head R1, the arms R2 and the legs R3, respectively, in accordance with an instruction from the controller 40.

The data sensed by the gyro-sensor SR1 or GPS receiver SR2 is outputted to the controller 40. The controller 40 uses this data to decide the action of the robot R, and sends it to a robot controller 3 through the radio communicator 60.

[Radio Communicator]

The radio communicator 60 is a communication device that sends/receives data to or from the robot controller 3. The radio communicator 60 is composed of a public line communication device 61a and a wireless communication device 61b.

The public line communication device 61a is a wireless communicator using a public line such as a portable phone line or a personal handy phone system (PHS) line. Meanwhile, the wireless communication device 61b is a short-distance wireless communicator such as a wireless LAN in accordance with IEEE802.11b.

The radio communicator 60 selects one among the public line communication device 61a and the wireless communication device 61b, depending on a connection request from the robot controller 3, thereby sending/receiving data to or from the robot controller 3.

[Surrounding Area Sensor]

Referring to FIG. 2, the surrounding area sensor 70 includes a laser device 71, a light emitting diode (LED) device 72, infrared cameras 73 and 73, and a sensor controller 80. Herein, the laser device 71 and the LED device 72 refer to a slit light device and an infrared device, respectively.

The surrounding area sensor 70 irradiates a detection area with slit light from the laser device 71 or infrared rays from LED device 72, and it then captures the images of a detection area by using the infrared cameras 73 and 73, thereby sensing the surrounding conditions of the robot R. These operations are carried out under the control of the sensor controller 80. The surrounding area sensor 70 corresponds to a combination of the road surface sensing device and the current location verification device. The infrared cameras 73 and 73 are shared by both devices, so that the inner space of the robot R decreases. The surrounding area sensor 70 is connected to the controller 40, and it may acquire self-location data from the gyro-sensor SR1 or GPS receiver SR2.

Figure 3:
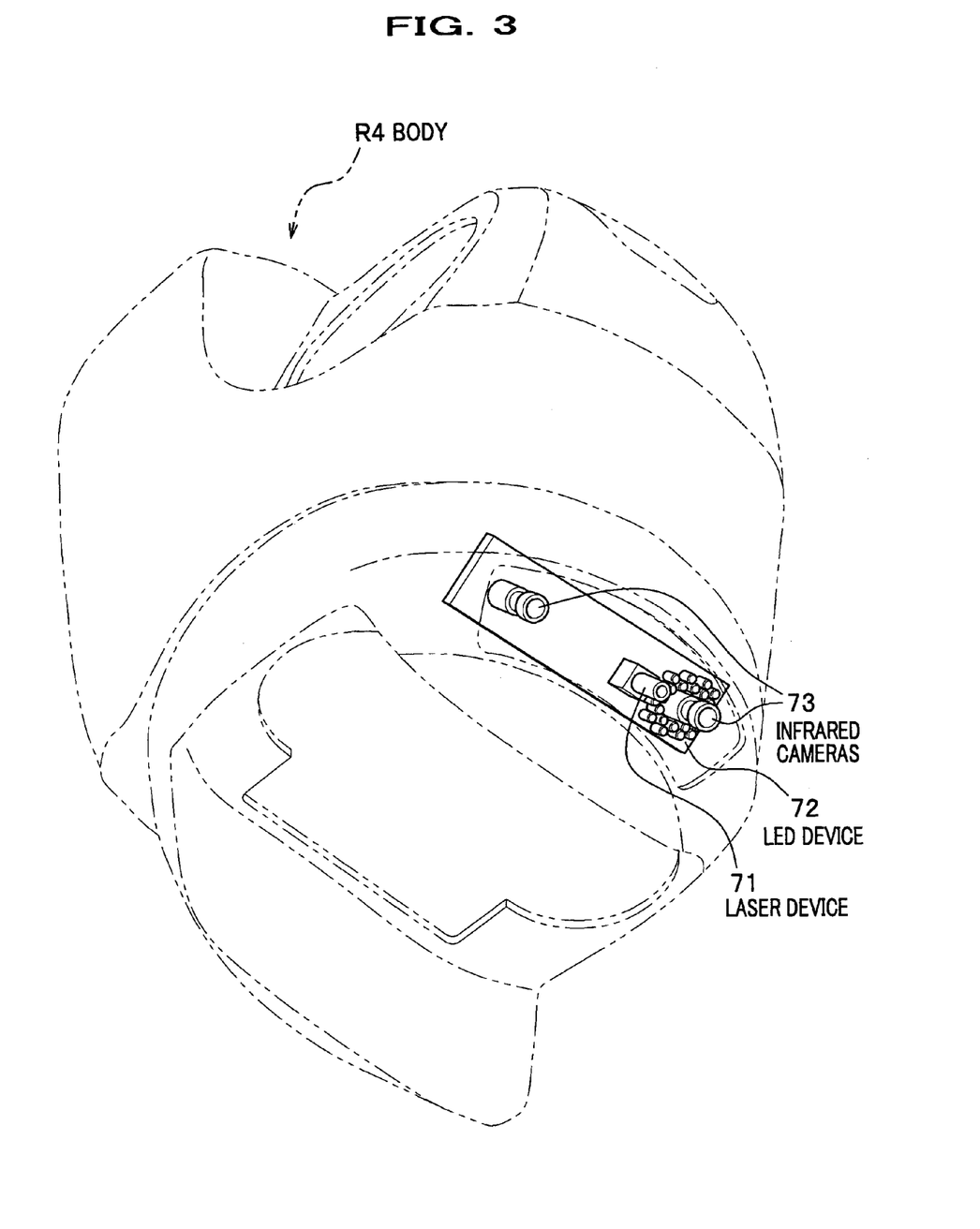
FIG. 3 is a perspective view depicting a body of the autonomous mobile robot.

Referring to FIG. 3, the infrared cameras 73 and 73 are arranged horizontally on the front of the body R4 at its waist height in this embodiment. The laser device 71 is located in the middle of the infrared cameras 73 and 73. The LED device 72 is placed around one (left one in FIG. 3) of the infrared cameras 73 and 73. As described above, the laser device 71, infrared LED device 72 and infrared cameras 73 and 73 are attached to the front of the body R4 at its waist height. This can be effective to isolate these components from the vibration of the robot R or from the interference of the arms R2 or legs R3, which would otherwise be experienced when attached to other portions of the body R4.

[Laser device]

The laser device 71 outputs slit light. This device, which is connected to an actuator (not shown) for changing its light direction, is configured to irradiate the road surface, that is, the detection area with radial slit light. The slit light irradiated on an object, such as the road surface, forms bright lines. The laser device 71 is connected to a sensor controller 80 (switch determination unit 82) (described later), and it turns on/off the slit light in response to an instruction from the sensor controller 80.

[LED Device]

The LED device 72 radiates infrared rays to the detection area. In this embodiment, the LED device 72 is made up of multiple LEDs arranged around the left infrared camera 73, as shown in FIG. 3. The rays from the LED device 72 are to be reflected by the marks M. The LED device 72 is connected to the sensor controller 80 (switch determination unit 82) (described later), and it turns on/off the infrared rays in response to an instruction from the sensor controller 80.

[Infrared Camera]

The infrared cameras 73 and 73 pick up images of objects in a digital format, and they may be a CCD infrared camera. As shown in FIG. 3, the infrared cameras 73 and 73 are arranged horizontally on the front of the body R4 at its waist height. The infrared cameras 73 and 73 output the captured images to the sensor controller 80.

The image produced by shooting the slit light on a detection area with the infrared cameras 73 and 73 contains bright lines. Thereinafter, this image is called "slit light image". Based on the bright lines, a length between the robot R and the shot object are estimated by employing a specific method such as the light section method. The slit lights are shot by the dual infrared cameras 73 and 73, whereby the road surface is detected in 3D dimensions. This is how the detailed geometry of the road surface can be recognized.

The image generated by shooting the infrared rays on a detection area with the infrared camera 73 contains marks M. Thereinafter, this image is called "infrared image". As shown in FIG. 3, the infrared cameras 73 and 73 are fixed to the waist of body R4 of the robot R at a predetermined angle. Accordingly, a relative positional relation between the marks M and the infrared camera 73, that is, between the marks M and the robot R is estimated based on where the marks M are positioned on the image. The infrared image does not need to be captured by both infrared cameras 73 and 73. In this embodiment, only the left infrared camera 73 is used.

[Sensor Controller]

Figure 4:
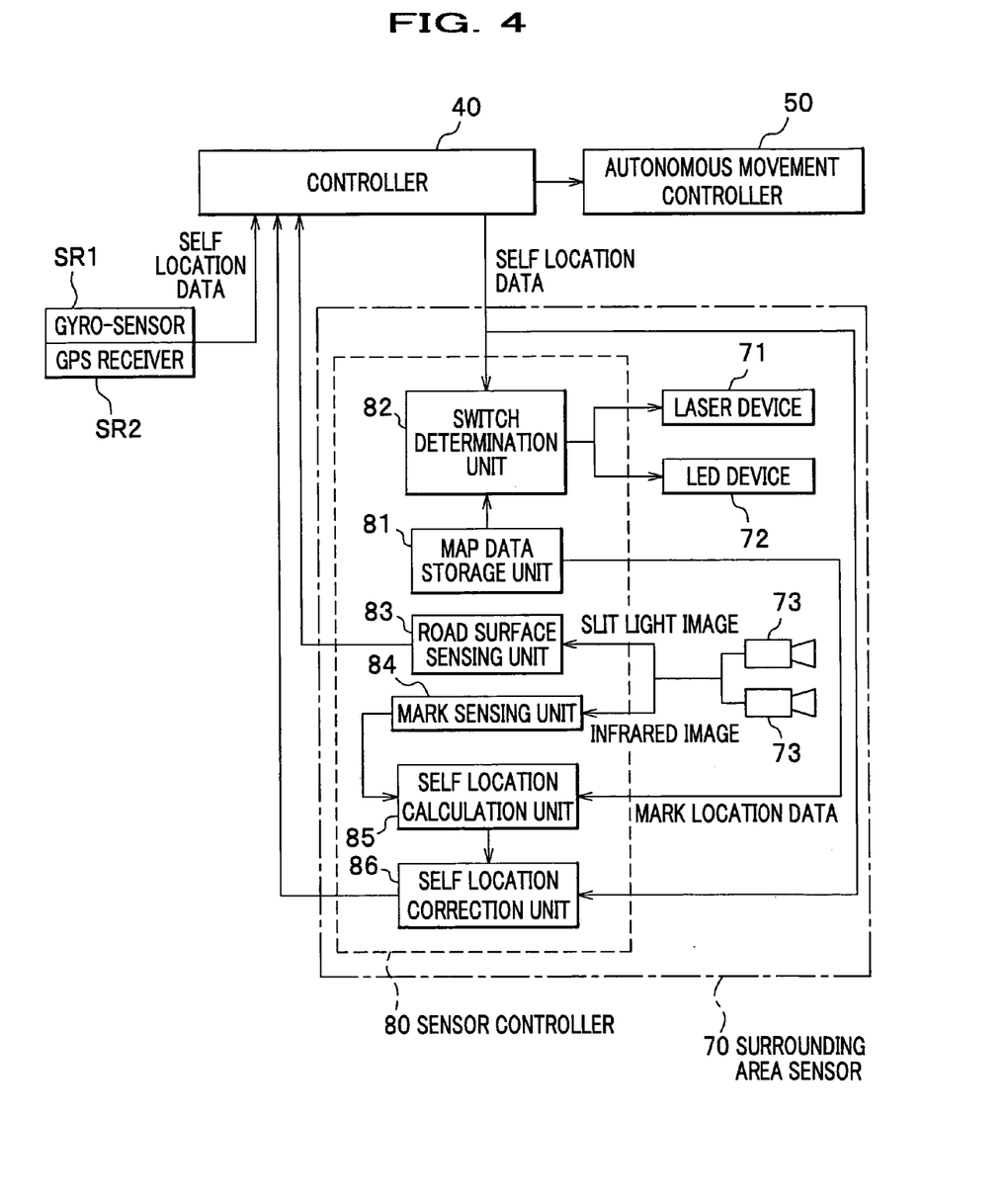
FIG. 4 is a block diagram of a surrounding area sensor of the autonomous mobile robot.

Next, a detailed description will be given below, of the sensor controller 80. Referring to FIG. 4, the sensor controller 80 includes the map data storage unit 81, a switch determination unit 82, a road surface sensing unit 83, a mark sensing unit 84, a self-location calculation unit 85, and a self-location correction unit 86.

[Map Data Storage Unit]

The map data storage unit 81 stores map data on the active area where the robot R moves around, and it may be a random access memory (RAM), read only memory (ROM) or hard disk. The map data contains position data and mark-formed region data. The position data indicates where the individual marks M are placed on the active area, while the mark-formed region data indicates data generated by adding a predetermined width to the position data. The map data storage unit 81 outputs the stored map data to the switch determination unit 82 and self-location calculation unit 85.

[Switch Determination Unit]

The switch determination unit 82 determines whether or not the self-location of the robot R is within the mark-formed region by comparing the mark-formed region data (in the map data received from the map data storage unit 81) and self-location data (received from the gyro-sensor SR1 or GPS receiver SR2 via the controller 40). The switch determination unit 82, which is connected to the laser device 71 and LED device 72, is configured to send an active or stop instruction to both devices.

If the self-location is determined to be out of the mark-formed region, then switch determination unit 82 sends an active instruction to the laser device 71 as well as the stop instruction to the LED device 72. Otherwise, if the self-location is determined to be within the mark-formed region, then switch determination unit 82 outputs a stop instruction to the laser device 71 as well as an active instruction to the LED device 72.

[Road Surface Sensing Unit]

The road surface sensing unit 83 detects the conditions of the road surface by analyzing the slit light image having been captured by the infrared cameras 73 and 73. Specifically, it determines a distance between the area on the road surface irradiated with the slit light and both the infrared cameras 73 and 73, by employing the light section method. The slit light is irradiated on the front area of the road in the direction where the robot R moves. Therefore, the robot R realizes the geometry of the road in the moving direction. The road surface sensing unit 83 outputs the information on the conditions of the road surface to the controller 40.

[Mark Sensing Unit]

The mark sensing unit 84 analyzes the infrared image having been captured by the infrared camera 73 in order to detect the marks.

The unit 84 may monitor the rays outputted from the LED device 72 selectively through a band pass filter. This filter has a cut-off frequency which is nearly equal to the center frequency of rays from the LED device 72. This enables the rays of unwanted frequencies to be cut, so that the mark sensing unit 84 is isolated from disturbance light.

Furthermore, the mark sensing unit 84 measures individual distances of three points making up the mark M, and a distance between the pair of marks M (see FIG. 1). If the measured distances fall within predetermined lengths, then the unit 84 determines that the marks M are present. In this way, the mark sensing unit 84 resists disturbance light such as rays reflected by objects other than the marks M.

[Self-location Calculation unit]

The self-location calculation unit 85 determines a relative positional relation between the marks M and the robot R, based on the position or coordinates of the captured marks M on the infrared image.

The infrared cameras 73 and 73 are fixed to the waist of the robot R at a predetermined angle. Accordingly, it is possible to analyze where the marks M are positioned on the infrared image, that is, which pixels of the infrared image the marks M are positioned on. This makes it possible to determine the relative positional relation between the robot R and the marks M. Moreover, the self-location calculation unit 85 can calculate how much the robot R is inclined with respect to a straight line coupling the two marks. Consequently, the self-location calculation unit 85 calculates precise self location of the robot R, based on the coordinates of the marks M and the relative positional relation between the marks M and the robot R. The unit 85 outputs the self location of the robot R to the self-location correction unit 86.

[Self-location Correction Unit]

The self-location correction unit 86 corrects the self-location of the robot R, based on the position data of the marks M that has been detected by the mark sensing unit 84.

In this embodiment, the self-location correction unit 86 compares the two self-locations: one is determined by the self-location calculation unit 85 (first self-location); and the other acquired from the gyro-sensor SR1 or GPS receiver SR2 (second self-location). Then, if these locations differ from each other, then the unit 85 employs the second self-location, based on the premise that the first self-location is more correct than the second one. The corrected self-location data is delivered to the controller 40. As a result, errors made by the autonomous movement are eliminated, thus allowing the robot R to control its movement surely and precisely.

Note that the way how the self-location correction unit 86 corrects the self-location is not limited thereto. Alternatively, the autonomous movement controller 50 may adjust the location or orientation of the robot R in such a way that the marks M are positioned on a specific region of the infrared image.

<Control Process of Mobile Robot>

Figure 5:
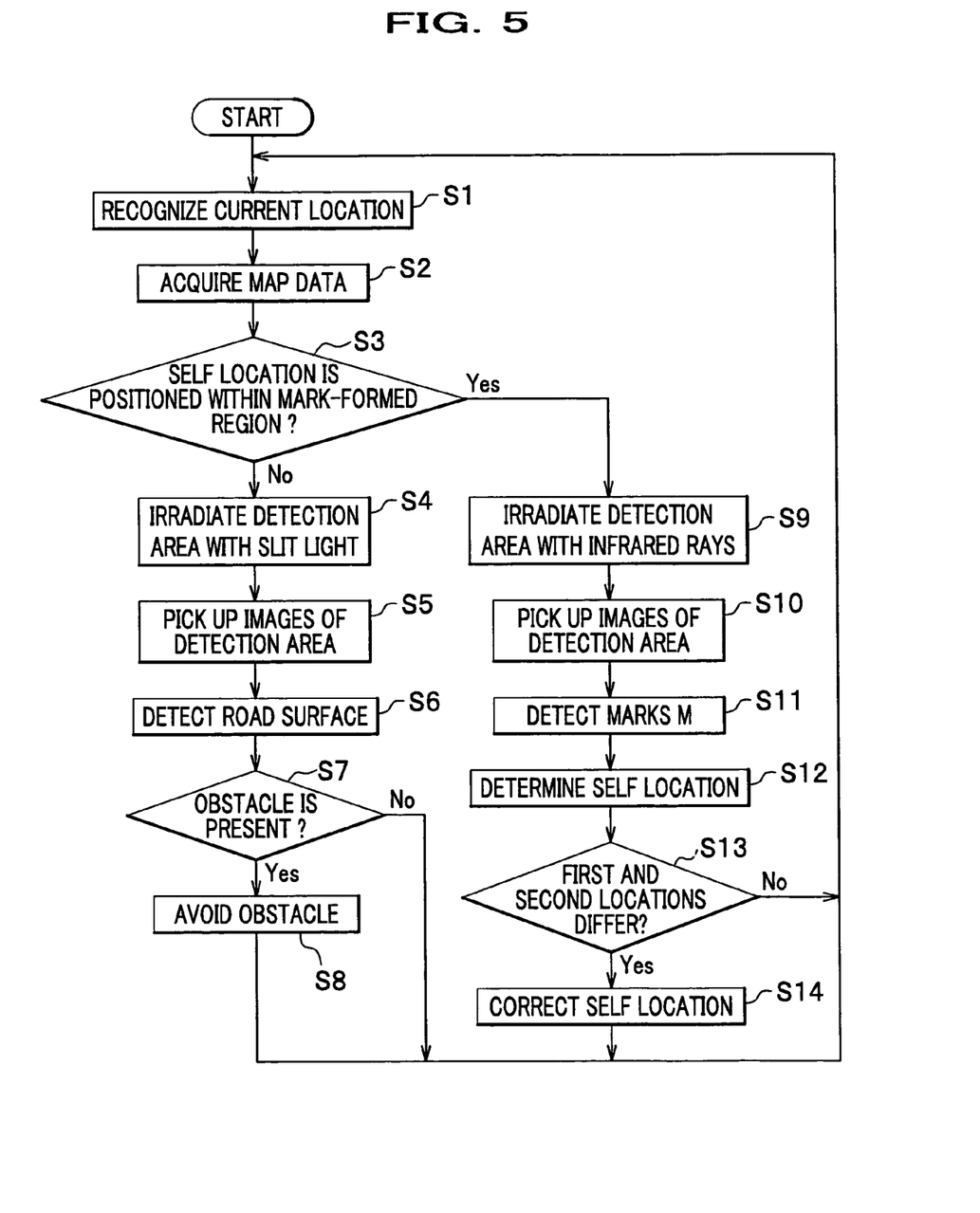
FIG. 5 is a flow chart for a process in which the autonomous mobile robot switches between slit light irradiation and infrared irradiation.

Now, a detailed description will be given below, of how to control the robot R, more specifically, how to switch between the slit light irradiation and the infrared irradiation, with reference to FIG. 5.

(Step 1)

First, the robot R acquires self-location data through the self-location recognition unit such as the gyro-sensor SR1 or GPS receiver SR2. Following this, the robot R realizes its current location from the self-location data, and then, outputs the data to the switch determination unit 82 through the controller 40.

(Step 2)

The switch determination unit 82 acquires map data containing the position data on marks M from the map data storage unit 81.

(Step 3)

The switch determination unit 82 compares the self-location of the robot R and the mark-formed region of the marks M, thereby determining whether or not the self-location is positioned within the mark-formed region. Specifically, the area which is located at less than a predetermined distance away from the marks M is set as the mark-formed region of the marks M beforehand. Furthermore, this region is stored in the map data storage unit 81.

Note that the way to determine the mark-formed region is not limited thereto. Alternatively, the switch determination unit 82 may calculate the distance between the self-location and the marks M, and then, determines that the robot R stands within the mark-formed region if the calculated distance is less than a predetermined threshold value. Upon determination, the unit 82 may account for the moving direction of the robot R. In this case, if moving away from the marks M, then the robot R does not detect the marks M. Hence, even if the distance between the marks M and the self-location of the robot R is less than the threshold value, then switch determination unit 82 may determine that the robot R is not within the mark-formed region.

(Step 4)

If the self-location is determined to be out of the mark-formed region ("No" at the step 3), then the switch determination unit 82 outputs an active instruction to the laser device 71 as well as a stop instruction to the LED device 72. Upon receipt of the active instruction, the laser device 71 irradiates the detection area on the road with radial slit light, as shown in FIG. 1A. In addition, upon receipt of the stop instruction, the LED device 72 stops radiating the rays.

(Step 5)

As soon as the laser device 71 outputs the slit light, the infrared cameras 73 and 73 pick up images of a detection area irradiated by the slit light, thereby obtaining slit light images. Subsequently, the cameras 73 and 73 output the slit light images to the road surface sensing unit 83.

(Step 6)

The road surface sensing unit 83 analyzes the slit light images with the light section method, thereby producing the geometry of the road surface. Thus, the unit 83 detects the road surface. Following this, the unit 83 outputs data on the geometry to the controller 40.

(Step 7)

The controller 40 compare the geometry of the road surface stored in the map data and that received from the road surface sensing unit 83. Subsequently, the controller 40 determines whether both geometries are identical or not. If they are identical or the difference thereof falls within an allowable range ("No" at the step 7), then the controller 40 determines there is not any obstacle. Subsequently, the process returns to the step 1 and the robot R re-starts sensing its surrounding area.

(Step 8)

Otherwise, if the geometries differ or the difference exceeds the allowable range ("Yes" at the step 7), then the controller 40 determines that an obstacle is present. Following this, the controller 40 sends an instruction for avoiding the obstacle to the autonomous movement controller 50. Specifically, this instruction allows the robot R to pass through a different road or to remove the obstacle from the road.

It is assumed that there is no obstacle on the road but step heights are formed thereon. In this case, the controller 40 manipulates the legs R3 or arms R2 of the robot R by not using the map data but the geometry data sensed by the road surface sensing unit 83. This results in the more precise control of the robot R.

Next, the process at the step 3 will be described again.

(Step 9)

If the self-location of the robot R is within the mark-formed region of the mark M ("Yes" at the step 3), then the switch determination unit 82 sends an active instruction to the LED device 72 as well as a stop instruction to the laser device 71. The LED device 72 irradiates the detection area on the road with infrared rays, in response to the active instruction (see FIG. 1B). The laser device 71 stops outputting the slit light, in response to the stop instruction.

(Step 10)

As soon as the LED device 72 irradiates the mark-formed region with the infrared rays, the infrared camera 73 picks up the images of the detection area, thereby producing an infrared image. Since the marks M made of a reflecting material are provided on the detection area, the infrared image contains the marks M. The infrared camera 73 outputs the infrared image to the mark sensing unit 84.

(Step 11)

Upon receipt of the infrared image, the mark sensing unit 84 extracts the marks M from the image through a band pass filter. This makes it possible to realize which the pixel of the image the marks M are positioned on.

(Step 12)

The self-location calculation unit 85 determines where the current location of the robot R is, based on which portion of the infrared image the marks M are positioned on. Specifically, the self-location calculation unit 85 calculates the relative distance and angle between the marks M and the robot R. Subsequently, the unit 85 executes an arithmetic process on the position data of the marks M read from the map data storage unit 81 by using the relative distance and the position data. Finally, the self-location of the robot R is determined. Due to the fact that the position and angle of the infrared cameras 73 and 73 are fixed, it is possible to determine the relative positional relation between the robot R and the marks M, based on which portion of the infrared image the marks M are positioned on. In addition, since two marks M make a pair, the relative angle between the marks M and the robot R can be determined. As a result, the orientation of the robot R is also corrected.

When the robot R moves, the height and angle of the infrared cameras 73 and 73 may be varied. However, the controller 40 can always monitor the pose of the robot R, based on the control data from the autonomous movement controller 50. Furthermore, the controller 40 estimates the distance between the cameras of the robot R in the basic pose and in the present pose. Finally, the controller 3 determines the precise height and angle of the infrared cameras 73 and 73 by using the estimated distance. Specifically, the height and angle of the infrared cameras 73 and 73 can be compensated by using a specific data called "bending model". This data is related to a relation between the pose of the robot R and both the height and angle of the infrared cameras 73 and 73, and it is obtained beforehand by measurement, simulations, etc.

The self-location data of the robot R is outputted to the self-location correction unit 86.

(Step 13)

The self-location correction unit 86 compares the two self-locations: one is determined by the self-location calculation unit 85 (first location); and the other is received from the gyro-sensor SR1 or GPS receiver SR2 (second location). If both self-locations are identical or the difference thereof falls within an allowable range ("No" at the step 13), the controller 40 does not correct the self-location. Then, the process returns to the step 1 and the robot R re-starts sensing its surrounding area.

(Step 14)

Otherwise, if both locations differ or they are out of the allowable range ("Yes" at the step 13), then the unit 85 employs the second self-location, based on the premise that the first self-location is more correct than the second one. As a result, the errors made by the autonomous movement are eliminated, thus allowing the robot R to control its movement surely and precisely.

With the above-described process, the robot R can switches between the slit light irradiation and the infrared irradiation appropriately. Consequently, it is possible to save a space inside the robot R by allowing the infrared cameras 73 and 73 to be in common use for both the slit light irradiation and the infrared irradiation. In addition, it is possible to decrease the power consumption of the robot R by irradiating the infrared rays only as necessary.

As described above, the description of the present invention has been described. However, the present invention is not limited thereto.

In this embodiment, the self-location calculation unit 85 determines the current location, that is, the absolute coordinates of the robot R, based on the position data on the marks M. However, alternatively, it may be possible to estimate the relative positional relation between the marks M and the robot R, based on the infrared image, and then, to correct the self-location of the robot R in such a way that the estimated relation meets a predetermined condition. In this case, the coordinates of the robot R do not need to be determined, and this has an advantage that the robot R does not need to stop at a specific location.

In this embodiment, the robot R is equipped with the map data storage unit 81. Alternatively, the unit 81 may be contained in a robot controller 3 separated from the robot R, and acquires the map data through the radio communicator 60 and the controller 40. In this case, a combination of the robot R, base station 1 and robot controller 3 corresponds to the autonomous mobile robot.

Moreover, in addition to the map data storage unit 81, some or all of the switch determination unit 82, the road surface sensing unit 83, the mark sensing unit 84, the self-location calculation unit 85, and the self-location correction unit 86 may be contained in the robot controller 3. In this case, it is preferable that the slit light image or infrared image captured by the infrared cameras 73 and 73 be sent to the robot controller 3 through the radio communicator 60.

In addition, three points make up a single mark M and two marks M make a pair in this embodiment. However, the present invention is not limited thereto. Alternatively, the shape of a mark may be a line or dotted line.

Furthermore, the above described components are not limited to specific configurations such as hardware, software or a combination thereof. These components may be implemented with any configurations as long as their functions can be achieved.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. An autonomous mobile robot, comprising:
    a moving mechanism;
    an autonomous movement controller configured to control the moving mechanism;
    a self-location recognition unit configured to sense a self-location of the autonomous mobile robot within an active area;
    a map data storage unit configured to store a map data on locations of marks formed on the active area;
    a slit light device configured to irradiate a detection area with slit light;
    an infrared device configured to irradiate a detection area with infrared rays;
    a switch determination unit configured to compare a mark-formed region stored in the map data storage unit and the self-location sensed by the self-location recognition unit, and then, configured to switch between the slit light device and the infrared device, based on a result of the comparison;
    a capture unit configured to capture an image of the detection area irradiated by the slit light or infrared rays;
    a road surface sensing unit configured to detect conditions of a road surface by analyzing the captured image of the detection area being irradiated with the slit light; and
    a mark sensing unit configured to detect marks by analyzing the captured image of the detection area being irradiated with the infrared rays,
    wherein the infrared device irradiates the detection area upon the self-location being within the mark-formed region, while the slit light device irradiates the detection area upon the self-location being out of the mark-formed region.

2. The autonomous mobile robot according to claim 1, further comprising a self-location correction unit configured to correct the self-location, based on locations of the marks detected by the mark sensing unit.

3. The autonomous mobile robot according to claim 2, wherein the moving mechanism comprises a legged moving mechanism.

4. The autonomous mobile robot according to claim 2, wherein the slit light device, the infrared device and the capture unit are attached to a front body of the autonomous mobile robot at its waist height.

5. The autonomous mobile robot according to claim 2, wherein the capture unit is shared by both the slit light device and the infrared device.

6. The autonomous mobile robot according to claim 1, further comprising a base station and a robot controller, the robot controller comprising the map data storage unit.

7. The autonomous mobile robot according to claim 1, wherein the moving mechanism comprises a legged moving mechanism.

8. The autonomous mobile robot according to claim 1, wherein the slit light device, the infrared device and the capture unit are attached to a front body of the autonomous mobile robot at its waist height.

9. The autonomous mobile robot according to claim 1, wherein the capture unit is shared by both the slit light device and the infrared device.

10. A process for controlling an autonomous mobile robot, comprising:
    sensing a self-location of the autonomous mobile robot within an active area;
    acquiring a map data on locations of marks formed on the active area;
    comparing the self-location and a mark-formed region being acquired from the map data; and
    switching between slit light and infrared rays, based on a result of the comparison, so that a detection area is irradiated,
    wherein the slit light and the infrared rays are switched in such a way that the detection area is irradiated by the infrared rays upon the self-location being within the mark-formed region, while the detection area is irradiated by the slit light upon the self-location being out of the mark-formed region.

* * * * *